C. S. SNAVELY

May 19, 1931. RAILWAY TRAFFIC CONTROLLING APPARATUS Re. 18,079

Original Filed Oct. 18, 1926 3 Sheets-Sheet 1

INVENTOR:
C. S. Snavely
by A. L. Venable
his attorney

C. S. SNAVELY
May 19, 1931. RAILWAY TRAFFIC CONTROLLING APPARATUS Re. 18,079
Original Filed Oct. 18, 1926 3 Sheets-Sheet 2
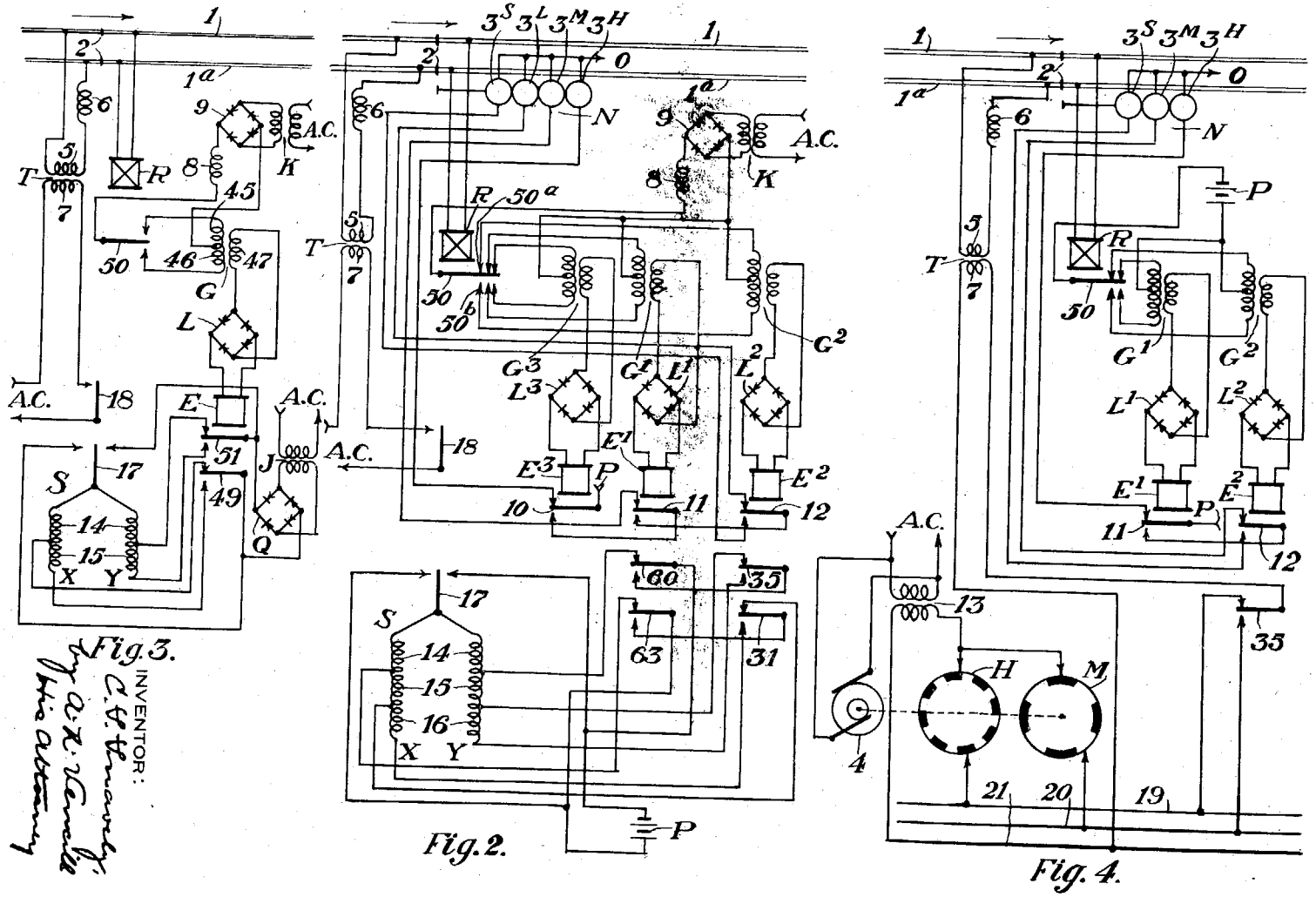
INVENTOR:
C. S. Snavely,
by A. R. Verrall
his Attorney

C. S. SNAVELY

May 19, 1931. RAILWAY TRAFFIC CONTROLLING APPARATUS Re. 18,079

Original Filed Oct. 18, 1926 3 Sheets-Sheet 3

INVENTOR:
C. S. Snavely
by A. R. Ventrill
His Attorney

Reissued May 19, 1931 Re. 18,079

UNITED STATES PATENT OFFICE

CLARENCE S. SNAVELY, OF PITTSBURGH, PENNSYLVANIA, ASSIGNOR TO THE UNION SWITCH & SIGNAL COMPANY, OF SWISSVALE, PENNSYVLANIA, A CORPORATION OF PENNSYLVANIA

RAILWAY TRAFFIC CONTROLLING APPARATUS

Original No. 1,709,920, dated April 23, 1929, Serial No. 142,162, filed October 18, 1926. Application for reissue filed November 25, 1930. Serial No. 498,192.

My invention relates to railway traffic controlling apparatus, and particularly to apparatus of the type wherein coded current impulses are applied to the track rails for the purpose of controlling train-carried governing mechanism or wayside signals or both.

I will describe several forms of apparatus embodying my invention, and will then point out the novel features thereof in claims.

Figure 1:
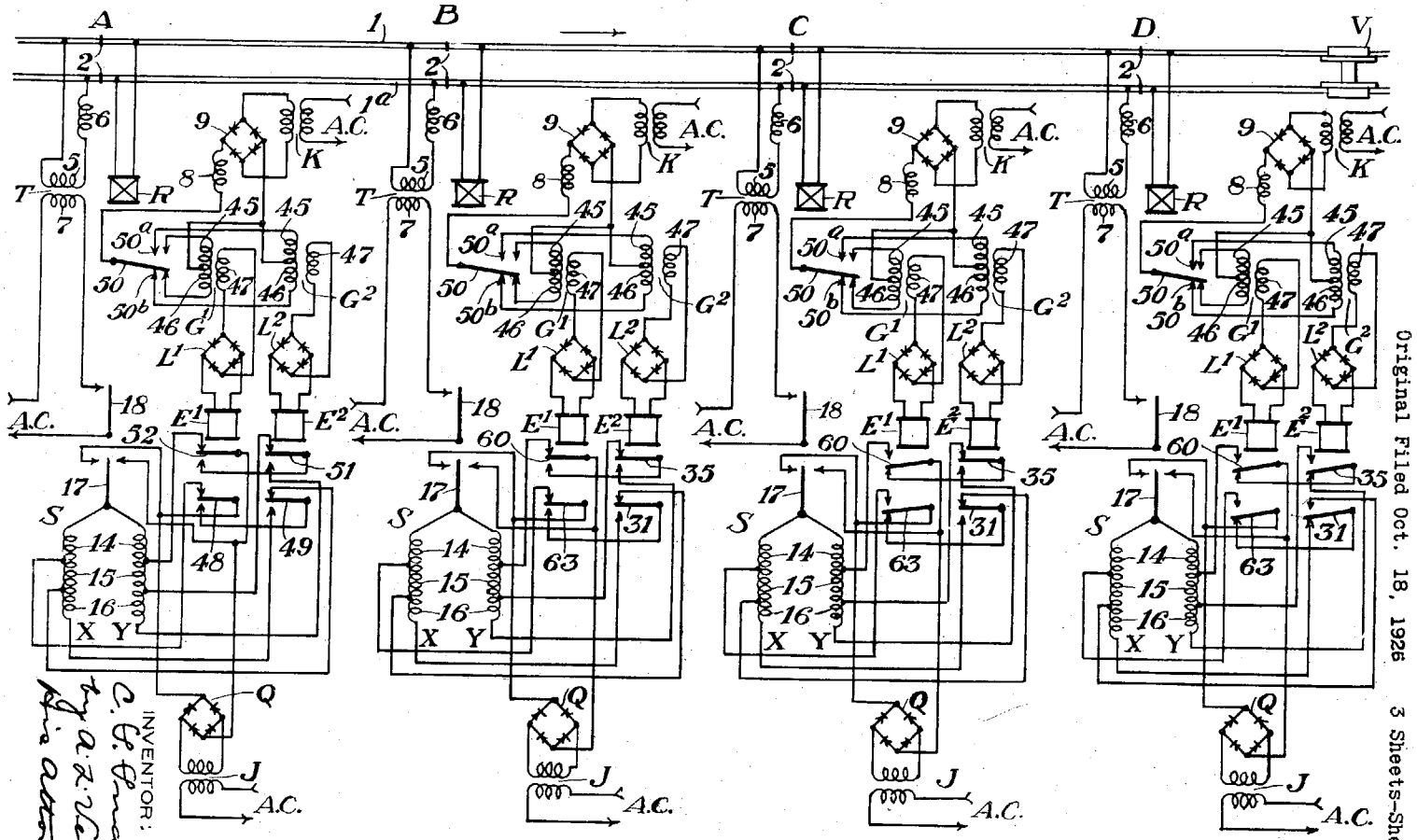
Figure 5:
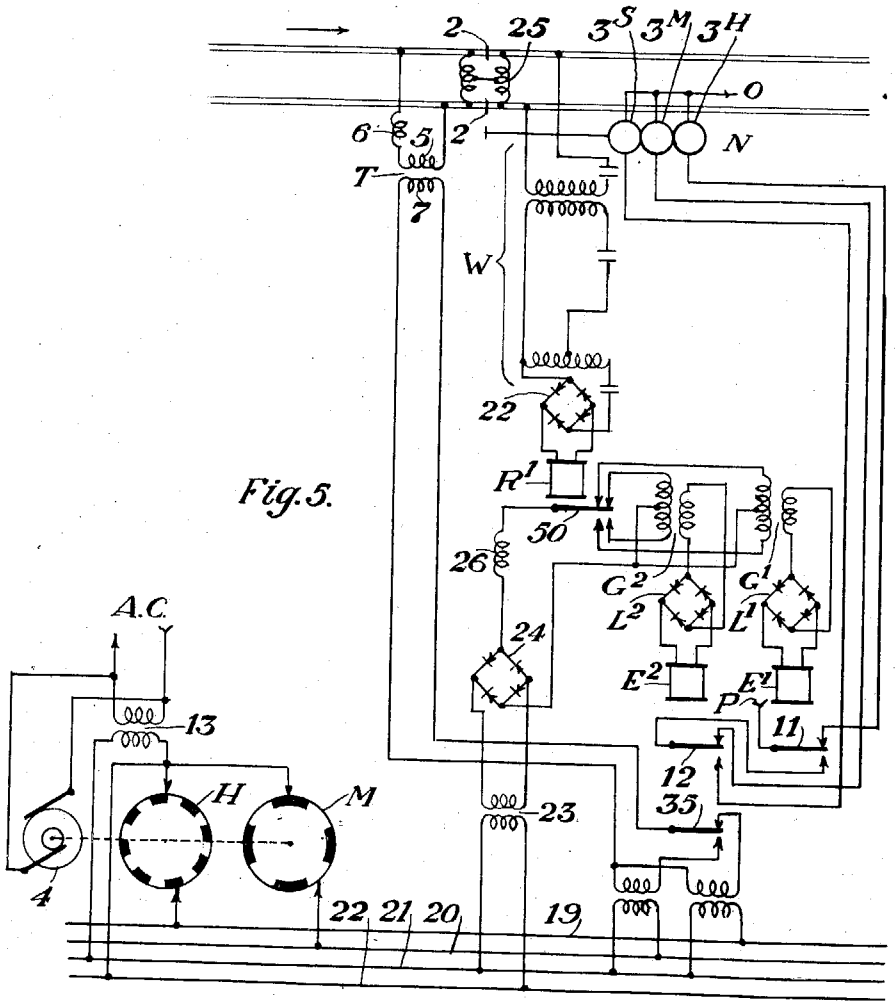
Figure 6:
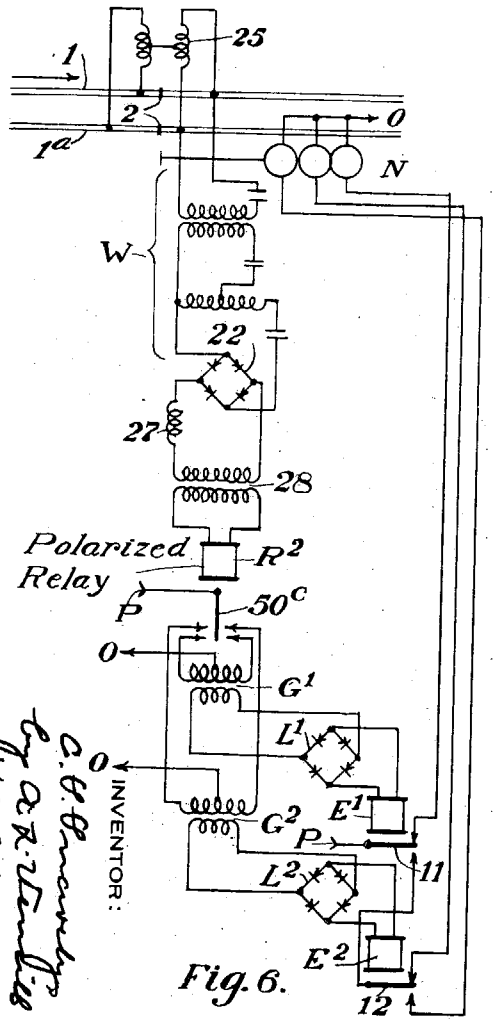

In the accompanying drawings, Fig. 1 is a diagrammatic view showing one form of apparatus embodying my invention, the apparatus in the form here shown being arranged for the control of train-carried governing mechanism. Fig. 2 is a diagrammatic view similar to Fig. 1 but modified for the control of wayside signals as well as train-carried governing mechanism, and also embodying my invention. Fig. 3 is a view showing a modification of the apparatus shown in Fig. 1 and embodying my invention. Fig. 4 is a view showing still another modification of the apparatus shown in Fig. 1 and also embodying my invention. Fig. 5 is a view showing a modified form of apparatus embodying my invention arranged for use on an alternating current electric railway and adapted for the control of wayside signals as well as train-carried governing mechanism. Fig. 6 is a view showing a modification of the apparatus shown in Fig. 5 and likewise embodying my invention.

Similar reference characters refer to similar parts in each of the several views.

Referring first to Fig. 1, the reference characters 1 and $1^a$ designate the track rails of a stretch of railway track over which traffic normally moves in the direction indicated by the arrow. These rails are divided by insulated joints 2 to form a plurality of successive track sections of which only three complete sections A—B, B—C and C—D are shown in the drawings. Each track section is provided with a track transformer T having a secondary 5 which is constantly connected across the track rails adjacent the exit end of the section through the usual limiting impedance 6. The primary 7 of each track transformer is at times connected with a source of alternating current which is not shown in the drawings but is indicated by the reference character A. C. The supply of alternating current from this source to the primary 7 is controlled by a contact 18 of a coding device explained hereinafter. Each track section is further provided with a track relay R which is connected across the rails adjacent the entrance end of the section.

Each track section is provided with a coding relay S which comprises two windings X and Y each made up of three coils 14, 15 and 16. The armature of this relay controls two contacts 17 and 18 which are arranged to occupy one extreme position or the other according as the armature is attracted by winding X or winding Y. Each coding relay is supplied with unidirectional current from a transformer J through a rectifier Q, the primary of each transformer J being connected with a source of alternating current which is not shown in the drawings but which is indicated by the reference character A. C. The supply of current from each rectifier Q to the coding relay S is controlled by two selector relays $E^1$ and $E^2$, which in turn are controlled in the manner hereinafter explained. Referring for example to the coding relay S located at the point B, when relay $E^1$ is energized, current flows from the rectifier Q through front contact 60 of relay $E^1$, coils 14 of windings Y and X in series, and front contact 63 of relay $E^1$ to the rectifier Q. Coil 14 of relay X is provided with a shunting path which passes from the lower terminal of this coil through front contact 63 of relay $E^1$, left-hand point of contact 17 of relay S to the upper terminal of the coil 14. Coil 14 of winding Y is provided with a similar shunting path which passes from the lower terminal of this coil through front contact 60 of relay $E^1$ and the right-hand point of contact 17 to the upper terminal of coil 14. When relay $E^1$ is energized, relay S operates to close contact 18 periodically, so that the alternating current supplied to the track rails of section A—B by the track transformer T is periodically interrupted.

Referring now to the coding relay S at location C when relay $E^1$ is deenergized and relay $E^2$ is energized, the operating circuit for windings X and Y is from the rectifier Q through back contact 60 of relay $E^1$, front contact 35 of relay $E^2$, coils 15 and 14 of winding Y in series, coils 14 and 15 of winding X in series, front contact 31 of relay $E^2$, and back contact 63 of relay $E^1$ to rectifier Q. The shunting paths for coils 14 and 15 include the contact 17 as before and will be apparent from the drawings without detailed explanation. Due to the increased reactance of the windings X and Y when coils 14 and 15 are both included in the operating circuit, the operation of the relay S is slower than when only one coil of each winding is energized.

Referring now to the coding relay S shown at location D, when both of the selector relays $E^1$ and $E^2$ are deenergized, the operating circuit for the coding relay is from rectifier Q, through back contact 60 of relay $E^1$, back contact 35 of relay $E^2$, coils 16, 15 and 14 of winding Y, coils 14, 15 and 16 of winding X, back contact 31 of relay $E^2$, and back contact 63 of relay $E^1$ to the rectifier Q. The shunting paths for the windings X and Y will be apparent from the foregoing explanation. Owing to the still greater reactance of the windings X and Y when all three coils of each winding are included in the operating circuit, the operation of the relay S is still slower than when two coils of each winding are included in the circuit.

It follows from the foregoing that the periodic interruptions of the alternating current supplied to the rails of section C—D are at a relatively low frequency, while the periodic interruptions of the current supplied to the rails of section B—C are at an intermediate frequency, and the periodic interruptions of the current supplied to section A—B are at a relatively high frequency. These frequencies I will term the low speed code, the medium speed code, and the high speed code, respectively.

The track relay R for each section is, of course, periodically energized when the section is not occupied by a train, the frequency of energization of this relay being the same as the frequency of interruption of the alternating current supplied to the rails of the section, that is, the same as the frequency of operation of contact 18 of the coding relay S for such section.

Each section is provided with the two transformers $G^1$ and $G^2$ each having two primaries 45 and 46 and a secondary 47. When a track relay R is periodically operated, periodically varying fluxes of a frequency corresponding to the frequency of operation of relay R are created in the cores of the two associated transformers $G^1$ and $G^2$. When relay R is closed, unidirectional current is supplied from a suitable source, such as a rectifier 9 to the primaries 45 of transformers $G^1$ and $G^2$ in parallel. When relay R is open, however, unidirectional current is supplied to primaries 46 of the two transformers $G^1$ and $G^2$ from the rectifier 9. Each rectifier 9 is connected with the secondary of a transformer K, the primary of which is constantly supplied with alternating current from a source not shown in the drawings but indicated by the reference character A. C. It will be noted that direct current flows in opposite directions through the two primaries 45 and 46 of each transformer $G^1$ and $G^2$, and it follows that when relay R is in operation the magnetic fluxes in the two transformers are periodically reversed at a frequency corresponding to the frequency of interruption of the current in the track rails. Secondary 47 of transformer $G^1$ is connected through a rectifier $L^1$ with the selector relay $E^1$, whereas secondary 47 of transformer $G^2$ is connected through a rectifier $L^2$ with the selector relay $E^2$. The variations in the flux in the core of transformer $G^1$ creates surges of current in relay $E^1$, and the same thing is true of transformer $G^2$ and relay $E^2$. It is well known that if a transformer is designed so that for an input of one amplitude and frequency the core is substantially saturated, a certain amount of energy will be delivered at that frequency and at least as much energy will be delivered at higher frequencies, but that at lower frequencies with the same amplitude of electromotive force a smaller amount of energy is delivered by the transformer. I take advantage of this principle to select between the three codes delivered to the track rails of each section by the coding relay S. To do this, the parts are so proportioned that when the flux in transformer $G^2$ is being reversed at the relatively low frequency, the core of this transformer is substantially saturated and relay $E^2$ is supplied with sufficient energy to cause it to close its front contacts. It follows that this relay will also be energized when the flux is being reversed at the higher frequencies. The parts are further so proportioned that when the flux in transformer $G^1$ is being reversed at either of the intermediate or the high frequency, the core of this transformer is substantially saturated and sufficient energy is supplied to relay $E^1$ to cause it to close its front contacts. At the low frequency of interruption, however, relay $E^1$ is deenergized because the reversals of flux are of the same amplitude as before but the energy delivered by this transformer to relay $E^1$ is insufficient to energize the relay.

As shown in the drawings, the section immediately to the right of point D is occupied by a train V, so that track relay R for such section is continuously deenergized. Relays $E^1$ and $E^2$ at point D are therefore deenergized because the current flowing in the primary windings of transformers $G^1$ and $G^2$ is unidirectional. Coding relay S at location D is therefore operating at its lowest rate, so that the current in section C—D is interrupted at the low speed rate. At location C, relay $E^2$ is energized and relay $E^1$ is deenergized, so that coding relay S is operating at its intermediate rate, with the result that the current in section B—C is being interrupted at the intermediate speed rate. At location B, relays $E^1$ and $E^2$ are both energized, so that coding relay S is operating at its highest rate, with the result that the current in the rails of section A—B is being interrupted in accordance with the high speed code.

The apparatus shown in Fig. 1 is suitable for cooperation with any form of train-carried mechanism which is controlled by current in the track rails, and is selectively responsive to the frequency of interruption of such current. For example, the train-carried mechanism may be similar to that shown and described in my co-pending application filed May 29, 1926, Serial No. 112,491, for railway traffic controlling apparatus, it being understood that the mechanism shown in that application would be modified by the addition of a third transformer G and a third relay E to take advantage of the three codes in the track rails provided by the trackway apparatus shown in Fig. 1 of the present application.

Referring now to Fig. 2, the apparatus shown in this view is the same as that shown in Fig. 1, except that a third transformer $G^3$ and a third relay $E^3$ have been added, these parts being so proportioned that the relay $E^3$ becomes energized only in response to the high speed code. The operation of the relays $E^1$ and $E^2$, and the control of the coding relay S by these relays, are the same as in Fig. 1. The selector relays $E^1$, $E^2$ and $E^3$ are utilized in this view to control a wayside signal M having a high speed lamp $3^H$, a medium speed lamp $3^M$, a low speed lamp $3^L$, and a stop lamp $3^S$. When relay $E^3$ is energized, the high speed lamp $3^H$ is lighted, the circuit being from terminal P of a suitable source of current, through front contact 10 of relay $E^3$ and lamp $3^H$ to terminal O of the same source of current. When relay $E^3$ is open and relay $E^1$ is closed, the medium speed lamp $3^M$ is opened through back contact 10 of relay $E^3$ and front contact 11 of relay $E^1$. When relays $E^3$ and $E^1$ are both opened and relay $E^2$ is closed, the low speed lamp $3^L$ is lighted, the circuit being through back contact 10 of relay $E^3$, back contact 11 of relay $E^1$ and front contact 12 of relay $E^2$. When all three relays E are open, the stop lamp $3^S$ is lighted, the circuit including back contacts 10, 11 and 12 of the three relays. It will be seen that the only purpose of relay $E^3$ is to give a fourth indication in the wayside signal corresponding to the fourth indication given on a train when the high speed code is supplied to the track rails.

Referring now to Fig. 3, the apparatus shown in this view is similar to that shown in Fig. 1, except that each track section is provided with only one transformer G and one selector relay E, while the coding relay S has only two coils 14 and 15 in each of its windings X and Y. When a track section is occupied, relay E is deenergized so that relay E is open with the result that a low speed code is applied to the rails of the section next in the rear. When a section is unoccupied, however, relay E is energized regardless of whether the low speed or the high speed code is applied to the rails of the section, so that the high speed code will be applied to the rails of the section next to the rear. In other words, transformer K and relay E are so proportioned that the relay is energized in response to either code, but this relay is, of course, not energized in response to false alternating current constantly supplied to the track rails when the section is occupied.

The apparatus shown in Fig. 3 is suitable for use with the train-carried mechanism shown in my co-pending application, Serial No. 112,491, referred to hereinbefore.

Referring now to Fig. 4, the apparatus shown in this view is similar to that shown in Fig. 1, except that a wayside signal N is added, which signal is controlled by the selector relays $E^1$ and $E^2$. A further difference between the two views is that in Fig. 4 the periodically interrupted currents are generated at a central point and transmitted to each track section through line wires 19, 20 and 21. Located at such central point is a motor 4 constantly operated from a source of alternating current A. C., which motor drives two commutators H and M. The coded currents are supplied by a transformer 13, the primary of which is constantly connected with the source of alternating current A. C. One terminal of the secondary transformer 13 is connected with a common line wire 21, while the other terminal is connected with a medium speed code wire 20 through the commutator M and with a high speed code wire 19 through the commutator H. When relay $E^2$ is energized, the primary 7 of track transformer T is connected across the line wires 19 and 21 through front contact 35 of relay $E^2$, so that the high speed code is applied to the rails of the section in the rear. When relay $E^2$ is open, however, the primary 7 of transformer T is connected with the medium speed code wires 20 and 21, so that the medium speed code is applied to the rails of the section next in the rear.

When relay $E^1$ is closed, the high speed signal lamp $3^H$ is lighted; when the relay $E^1$ is open and relay $E^2$ is closed, the medium speed signal lamp $3^M$ is lighted; and when both relays $E^1$ and $E^2$ are open, the stop lamp $3^s$ is lighted. The circuits for these lamps will be apparent from the drawings and need not be traced in detail.

In Fig. 4 the primary current for transformers $G^1$ and $G^2$ is supplied by a battery P instead of by a transformer K and rectifier 9 as in the preceding views.

The apparatus shown in Fig. 4 is suitable for use with the train-carried governing mechanism shown in my copending application, Serial No. 112,491, referred to hereinbefore.

Referring now to Fig. 5, I have here shown a system embodying my invention applied to a railway the propelling energy for which is alternating current. Inductive bonds 25 are provided in accordance with the usual practice to conduct the propulsion current around the insulated joints 2. The coded currents are supplied from a central location as in Fig. 4 over line wires 19, 20 and 21 and a steady alternating current is also supplied from the transformer 13 to line wires 21 and 22. The unidirectional current for the transformers $G^2$ and $G^1$ is furnished from the line wires 21 and 22 through a transformer 23, a rectifier 24 and a smoothing reactance 26. The supply of coded current is controlled as in Fig. 4 by contact 35 of relay $E^2$, and a wayside signal N is controlled jointly by the relays $E^1$ and $E^2$. A filter device W is interposed between the track rails 1 and $1^a$ and the track relay which is here designated $R^1$, which filter device freely transmits the alternating track circuit current, that is, the current which is periodically interrupted to produce the codes. This filter device, however, will not transmit alternating current of the propulsion frequency. The track relay $R^1$ is a direct current relay furnished with unidirectional current from a rectifier 22 which in turn receives current from the filter device W.

The apparatus shown in Fig. 5 is suitable for use in connection with the train-carried governing mechanism shown in my co-pending application, Serial No. 112,491, referred to hereinbefore.

Referring now to Fig. 6, the apparatus here shown is the same as that shown in Fig. 5, except that the neutral track relay $R^1$ in Fig. 5 is replaced by a polarized track relay $R^2$ in Fig. 6. This relay $R^2$ receives energy from the filter device W through a rectifier 22, a smoothing reactance 27 and a transformer 28. An impulse of one polarity is obtained from the secondary of transformer 28 when a code impulse is applied to the track, and an impulse of the opposite polarity is received from the secondary of transformer 28 when a code impulse in the track ceases. These opposite impulses applied to the relay $R^2$ at the beginning and end of each track code impulse cause the relay to operate its contact $50^c$ in accordance with the code applied to the track rail.

Referring now to all of the views, all of the advantages of alternating current track circuits over direct current track circuits are retained, and in addition I have obtained the further advantages of coded currents for proceed indications over the ordinary continuously applied currents for these indications. Furthermore, this maximum protection against false proceed indications is obtained without the necessity for using any of the expensive alternating current relays. In Figs. 5 and 6 I have shown how complete installations may be made using direct current relays only, thereby providing maximum protection at minimum cost of both installation and maintenance.

In Figs. 1, 2 and 3, I have shown how any number of proceed indications within the limits of the code system may be transmitted from signal location to signal location without the use of line wires, thereby producing a wireless signal system for more than two proceed indications. The only line wires required in the systems shown in these views would be those for the transmission of power which would be necessary in any system using alternating current.

Furthermore, since the polarized track circuit system, such as is ordinarily used in present day installation, is eliminated, it is not necessary to use special slow-releasing relays to prevent a momentary red or stop indication in the wayside signal when changing from one proceed indication to another proceed indication. With the systems shown in the present disclosure the stop indication will never be displayed except in the absence of coded current, in which case, of course, the stop indication is desired. In the systems of the present disclosure the indications always follow in proper succession from any one indication to whatever next indication should be displayed.

Another advantage of the systems shown in the present disclosure is that track circuits of the usual steady current type are not required. As a matter of fact, the selector relays, transformers, rectifiers, etc. of the wayside equipment and of the train-carried equipment may be the same and therefore interchangeable.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, a stretch of railway track divided into sections, a track relay for each section, transformers for each section having different saturation characteristics, means controlled by the track relay for each section for creating in the associated transformers periodically varying fluxes the frequencies of which vary in accordance with the frequency of operation of the track relay, selector relays for each section one connected with the secondary of each associated transformer and each arranged to be energized when and only when the associated transformer is being supplied with flux at a frequency at least as high as the frequency at which the core of such transformer becomes saturated, and means controlled by the selector relays of each section for supplying current periodically interrupted at different frequencies to the rails of the section next in the rear.

2. In combination, a stretch of railway track divided into sections, a track relay for each section, transformers for each section having different saturation characteristics, means controlled by the track relay for each section for creating in the associated transformers periodically varying fluxes the frequencies of which vary in accordance with the frequency of operation of the track relay, selector relays for each section one connected with the secondary of each associated transformer and each arranged to be energized when and only when the associated transformer is being supplied with flux at a frequency at least as high as the frequency at which the core of such transformer becomes saturated, signals for the sections controlled by said selector relays, and means controlled by the selector relays of each section for supplying current periodically interrupted at different frequencies to the rails of the section next in the rear.

3. In combination, a stretch of railway track divided into sections, a track relay for each section, a transformer for each section, means controlled by the track relay of each section for creating in the core of the associated transformer a periodically varying flux, the frequency of which varies in accordance with the frequency of operation of the track relay, a selector relay for each section connected with the secondary of the associated transformer and arranged to be energized when and only when the transformer is being supplied with periodically varying flux due to periodic operation of the associated track relay, and means controlled by the selector relay of each section for supplying the rails of the section next in the rear with current periodically interrupted at one frequency or another according as the relay is energized or deenergized.

4. In combination, a stretch of railway track divided into sections, a track relay for each section, transformers for each section, having different saturation characteristics, means controlled by the track relay for each section for creating in the associated transformers periodically varying fluxes the frequencies of which vary in accordance with the frequency of operation of the track relay, selector relays for each section one connected with the secondary of each associated transformer and each arranged to be energized when and only when the associated transformer is being supplied with flux at a frequency at least as high as the frequency at which the core of such transformer becomes saturated, transmission lines extending along the trackway and carrying currents periodically interrupted at different frequencies, and means controlled by the selector relays of each section for connecting one or another of said transmission lines with the rails of the section next in the rear.

5. In combination, a stretch of railway track divided into sections, a track relay for each section, transformers for each section having different saturation characteristics, means controlled by the track relay for each section for creating in the associated transformers periodically varying fluxes the frequencies of which vary in accordance with the frequency of operation of the track relay, selector relays for each section one connected with the secondary of each associated transformer and each arranged to be energized when and only when the associated transformer is being supplied with flux at a frequency at least as high as the frequency at which the core of such transformer becomes saturated, signals for the sections controlled by said selector relays, transmission lines extending along the trackway and carrying currents periodically interrupted at different frequencies, and means controlled by the selector relays of each section for connecting one or another of said transmission lines with the rails of the section next in the rear.

6. In combination, a stretch of railway track divided into sections and carrying alternating propulsion current of one frequency, a track relay for each section, transformers for each section having different saturation characteristics, means controlled by the track relay for each section for creating in the associated transformers periodically varying fluxes the frequencies of which vary in accordance with the frequency of operation of the track relay, selector relays for each section one connected with the secondary of each associated transformer and each arranged to be energized when and only when the associated transformer is being supplied with flux at a frequency at least as high as the frequency at which the core of such transformer becomes saturated, and means controlled by the selector relays of each section for supplying to the rails of the section next in the rear an alternating signaling current of a frequency different from that of the propulsion current and periodically interrupted at different frequencies depending upon the energization of said selector relays.

7. In combination, a stretch of railway track divided into sections and carrying alternating propulsion current of one frequency, a track relay for each section, transformers for each section having different saturation characteristics, means controlled by the track relay for each section for creating in the associated transformers periodically varying fluxes the frequencies of which vary in accordance with the frequency of operation of the track relay, selector relays for each section one connected with the secondary of each associated transformer and each arranged to be energized when and only when the associated transformer is being supplied with flux at a frequency at least as high as the frequency at which the core of such transformer becomes saturated, means controlled by said selector relays of each section for supplying to the rails of the section next in the rear alternating signaling current of a frequency different from that of the propulsion current and periodically interrupted at a different frequency, and filtering means interposed between each track relay and the rails of the associated section for freely passing alternating current of the signaling frequency, but not of the propulsion frequency.

8. In combination, a stretch of railway track divided into sections, a track relay for each section, a transformer for each section, means controlled by the track relay of each section for creating in the core of the associated transformer a periodically varying flux the frequency of which varies in accordance with the frequency of operation of the track relay, a selector relay for each section connected with the secondary of the associated transformer and arranged to be energized when and only when the transformer is being supplied with periodically varying flux due to periodic operation of the associated track relay, transmission lines extending along the trackway and carrying currents periodically interrupted at different frequencies, and means controlled by the selector relay of each section for connecting one or another of said transmission lines with the rails of the section next in the rear according as the selector relay is energized or not.

9. In combination, a stretch of railway track divided into sections, a track relay having a winding connected with the rails of each section and responsive to periodic interruptions of alternating current in such rails, a plurality of decoding relays associated with each section, means for selectively energizing said decoding relays in accordance with the rate of operation of the associated track relay, means controlled by the decoding relays for each section for supplying alternating current to the rails of the section next in the rear periodically interrupted at different rates according to the conditions of the decoding relays, and signals for the sections controlled by said decoding relays.

10. In combination, a stretch of railway track divided into sections, a track relay having a winding connected with the rails of each section and responsive to periodic interruptions of alternating current in such rails, a plurality of decoding relays associated with each section, means for selectively energizing said decoding relays in accordance with the rate of operation of the associated track relay, and means controlled by the decoding relays for each section for supplying alternating current to the rails of the section next in the rear periodically interrupted at different rates according to the conditions of the decoding relays.

11. In combination, a stretch of railway track divided into sections, a track relay and at least two decoding relays $E^2$ and $E^1$ for each section, each track relay being responsive to periodic interruptions of alternating current in the track rails, means controlled by the decoding relays for each section for supplying the rails of the section next in the rear with alternating current periodically interrupted at one rate when both relays are deenergized, at a second rate when relay $E^2$ is energized and relay $E^1$ deenergized, and at a third rate when both relays are energized, means controlled by each track relay for energizing the associated relay $E^2$ in response to alternating current periodically interrupted at the first rate and for energizing both relays $E^2$ and $E^1$ in response to alternating current periodically interrupted at the second rate, and signals for the sections controlled by said decoding relays.

12. In combination, a stretch of railway track divided into sections, a track relay having a winding connected with the rails of each section and responsive to periodic interruptions of current in such rails, a plurality of decoding relays associated with each section, means for selectively energizing said decoding relays in accordance with the rate of operation of the associated track relay, means controlled by the decoding relays for each section for supplying current to the rails of the section next in the rear periodically interrupted at different rates according to the conditions of the decoding relays, and signals for the sections controlled by said decoding relays.

13. In combination, a stretch of railway track divided into sections, a track relay having a winding connected with the rails of each section and responsive to periodic interruptions of current in such rails, a plurality of decoding relays associated with each section, means for selectively energizing said decoding relays in accordance with the rate of operation of the associated track relay, and means controlled by the decoding relays for each section for supplying current to the rails of the section next in the rear periodically interrupted at different rates according to the conditions of the decoding relays.

14. In combination, a stretch of railway track divided into sections, a track relay having a winding connected with the rails of each section and responsive to periodically varying current in such rails, a plurality of decoding relays associated with each section, means for selectively energizing said decoding relays in accordance with the rate of operation of the associated track relay, means controlled by the decoding relays for each section for supplying current to the rails of the section next in the rear periodically varied at different rates according to the conditions of the decoding relays, and signals for the sections controlled by said decoding relays.

In testimony whereof I affix my signature.

CLARENCE S. SNAVELY.